United States Patent [19]

Nakanishi et al.

[11] Patent Number: 4,927,233
[45] Date of Patent: May 22, 1990

[54] REAR PROJECTION SCREEN

[75] Inventors: Yasuaki Nakanishi, Zama; Masao Inoue, Tokyo, both of Japan

[73] Assignee: Mitsubishi Rayon Co., Ltd., Japan

[21] Appl. No.: 319,629

[22] Filed: Mar. 6, 1989

[51] Int. Cl.⁵ .............................................. G03B 21/60
[52] U.S. Cl. .................................................... 350/128
[58] Field of Search ................................ 350/127, 128

[56] References Cited

U.S. PATENT DOCUMENTS

| | | | |
|---|---|---|---|
| 3,218,924 | 11/1965 | Miller | 350/128 |
| 3,523,717 | 8/1970 | Glenn, Jr. | 350/123 |
| 3,830,556 | 8/1974 | Bratkowski | 350/128 |
| 4,468,092 | 8/1984 | Inoue et al. | 350/128 |
| 4,509,823 | 4/1985 | Moriguchi et al. | 350/128 |
| 4,573,764 | 3/1986 | Bradley | 350/128 |
| 4,605,283 | 8/1986 | Stanton | 350/127 |
| 4,647,519 | 3/1987 | Speigel | 350/128 X |
| 4,660,920 | 4/1987 | van der Hoorn et al. | 350/128 X |
| 4,682,853 | 7/1987 | Broer et al. | 350/128 |
| 4,688,093 | 8/1987 | van der Staak et al. | 350/128 |
| 4,725,134 | 2/1988 | Ogino | 350/128 X |
| 4,730,897 | 3/1988 | McKechnie et al. | 350/128 |
| 4,767,186 | 8/1988 | Bradley, Jr. et al. | 350/128 |

FOREIGN PATENT DOCUMENTS

| | | |
|---|---|---|
| 54-134431 | 10/1979 | Japan . |
| 56-38035 | 4/1981 | Japan . |
| 55921 | 4/1983 | Japan . |
| 58-147318 | 9/1983 | Japan . |
| 204833 | 11/1984 | Japan . |

*Primary Examiner*—Richard A. Wintercorn
*Attorney, Agent, or Firm*—Brumbaugh, Graves, Donohue & Raymond

[57] ABSTRACT

A screen medium of a rear projection screen is formed on its incidence surface with lenticular lenses, and on its viewing surface with lenticular lenses in light focusing area and with grooves and ridges in no-light focusing areas. Each of the grooves is bordered by the ridges and filled therein a ink so as to form an ambient light absorbing layer.

6 Claims, 5 Drawing Sheets

REAR PROJECTION SCREEN

BACKGROUND OF THE INVENTION

The present invention relates to a rear projection screen or a light transmission screen which is suitably used for a video projection television, micro film-reader, or the like.

An example of a rear projection screen of this type is shown in FIG. 9, which comprises a rear projection screen or a so-called lenticular screen having a transparent medium 30 formed therein with micro projections such as, lenticular lenses 31 on one surface of the transparent medium (Japanese Patent Laid-open No. 54-134431).

Light rays from a projector are projected onto one surface (incidence surface X) of the transparent medium, and an image is observed on the other surface (viewing surface Y) of the transparent medium. That is, the projected light rays are focused on the viewing surface by each lenticular lens element 31 at a part around the optical axis of the lenticular lens element 31. In order to improve the contrast of the image, the screen is provided with stripe-like shade coatings 32 (hereinafter referred to "ambient light absorbing layer") located in an area (hereinafter referred to "no-light focusing area") of the viewing surface excluding the light focussing position and extending parallel to the longitudinal axis of the lenticular lense.

FIG. 10 and FIG. 11 show other examples of prior art, where the coating of the ambient light absorbing layer 32 is facilitated by providing projections 33 or hollowes 34 on the viewing surface. (Japanese Patent Laid-open No. 56-38035).

FIG. 12 shows further another example of prior art, where lenticular lenses are formed on both sides of a screen, and the coating of the ambient light absorbing layers 32 is facilitated by providing projections at a level higher than the top of the viewing side lenticular lens 35 (Japanese Patent Laid-open No. 58-147318).

However, the rear projection screen shown in FIG. 9 has a disadvantage that the ambient light absorbing layers have low adhesion and are liable to come off because they are coated on flat surfaces. In the case of rear projection screens as shown in FIGS. 10 and 12, in which ambient light absorbing layers 32 are coated on the top surfaces of projections 33 but are not on the side surfaces, thereof, no dark appearance are given as viewed laterally, and therefore there has been such a disadvantage that ambient light impinging upon the viewing surface reduces the contrast ratio of the image.

The rear projection screen shown in FIG. 11, where hollowes 34 are formed for receiving ambient light absorbing layers, causes a disadvantage that it is difficult to make clear the border lines of the light absorbing layers 32, in particular if the lenticular lenses are formed between the ambient light absorbing layers 32.

SUMMARY OF THE INVENTION

The present invention is devised so as to eliminate the above-mentioned disadvantages of prior arts.

One main object of the present invention is to provide a rear projection screen including light absorbing layers which are securely adhered to one surface of a screen medium for attaining an improved screen performance.

To the end, according to the present invention, there is provided a rear projection screen having an incidence surface upon which projection light rays impinge, and a viewing surface on which a projected image is visible, comprising lenticular lenses formed on the incidence surface for focusing the projection light rays on the viewing surface within light focusing areas other than no-light focusing areas, lenticular lenses formed on the viewing surface in the light focusing areas; and ambient light absorbing layers formed on the viewing surface in the no-light focusing areas, wherein each of the no-light focusing areas is formed therein with an ink filling groove and has ridges on both sides of the groove, each of the ridges having top edge, ink is filled in the groove in each no-light focusing area so as to form each of the ambient light absorbing layers having both side edges reaching the top edges of the ridges whereby the both side edges of each of the each light absorbing layers define straight border lines extending therealong.

The above-mentioned rear projection screen according to the present invention has advantages that the ambient light absorbing layers are securely held in the grooves by virtue of the side ridges, and the uncoated areas and the coated areas on the viewing surface are distinguished from each other through clear border lines, resulting in that there appear black fine stripes on the screen when viewed obliquely.

DETAILED DESCRIPTION OF THE INVENTION

Preferred embodiments of the present invention will be described below by referring to the drawings.

FIG. 1 is a schematic view illustrating a projector system in which a rear projection screen S as proposed by the present invention, having an incidence surface X and a viewing surface Y, and a projector L are provide.

Figure 2:
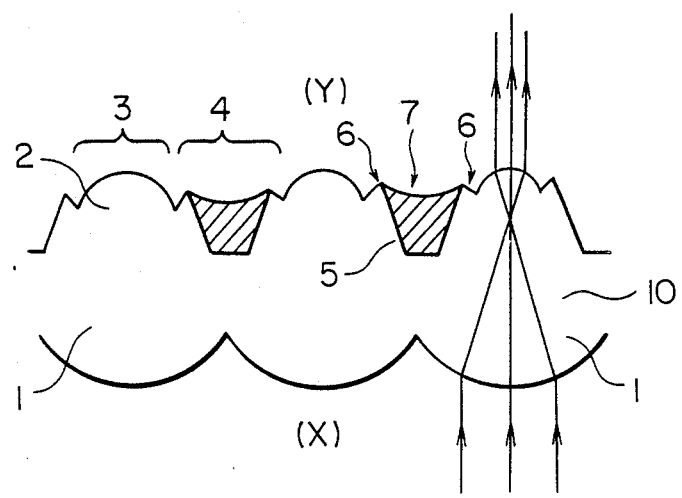
FIG. 2 is a schematic view illustrating a rear projection screen according to the present invention.
Figure 3:
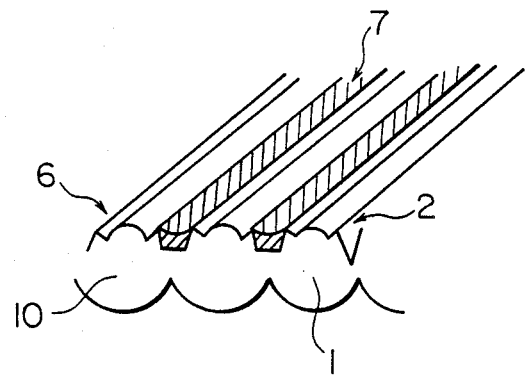
FIG. 3 is a perspective view illustrating a rear projection screen according to the present invention.
Figure 4:
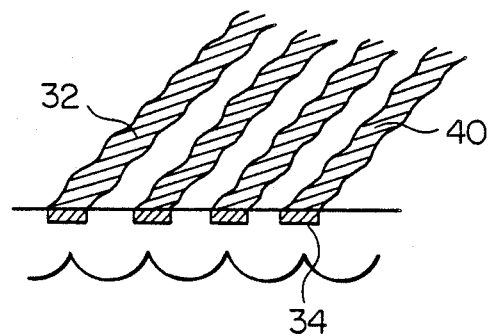
FIG. 4 is a perspective view illustrating a rear projection screen of a prior art.
Figure 11:
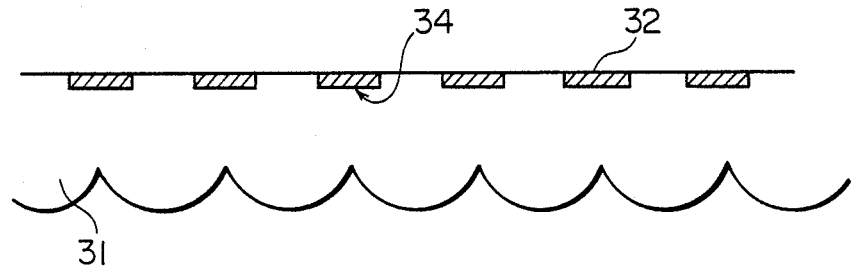
Figure 12:
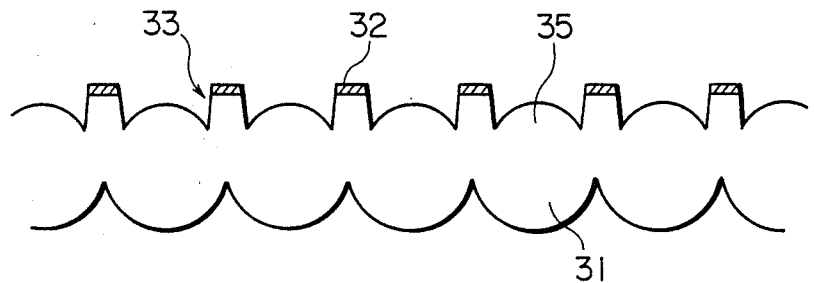

FIG. 2 indicates the incidence surface X, the viewing surface Y, a transparent screen medium 10, lenticular lenses 1 formed on the incidence surface, and lenticular lenses 2 formed on the viewing surface. Each of the lenticular lenses 2 on the viewing surface is located in a light focusing area 3 corresponding to the associated lenticular lens 1. Each of the no-light focusing area 4 includes a groove 5 to receive an ink for forming an ambient light absorbing layer, the ridges 6 of a triangular cross-sectional shape extending along both sides of the groove 5. In order to provide ambient light absorbing layers 7 on the screen medium, an ink for ambient light absorbing layers is poured into the grooves 5, and then dried. According to this embodiment, since each ambient light absorbing layer 7 is laid in the groove 5 and protected by the ridges 6, the layer 7 is prevented from coming off even when it may be rubbed, and effects black fine stripes of the screen as viewed laterally and a clear image on the screen. Further, as shown in FIG. 3, since the ambient light absorbing layer fills the groove to the level of tops of the ridges clear straight border lines of the ambient light absorbing layer are defined, and an excellent screen feature of absorbing ambient lights, and a good appearance of a product are assured. For comparison purpose, FIG. 4 shows a perspective view of the coating in the prior art screen shown in FIG. 11. In this case, since ambient light absorbing layers are disposed in hollowes formed on a flat surface of a screen, the layers are liable to come off from end surfaces 40 of the hollowes 34, although the coating of the layer may be easier. The border lines of coating layers are not clear. This tendency also appears in such a case that lenticular lenses are provided on the viewing side surface of the screen.

Figure 1:
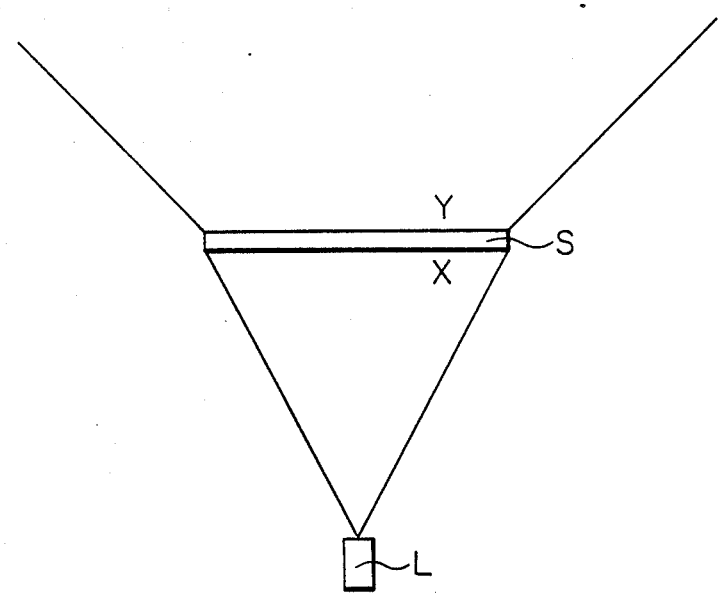
FIG. 1 is a schematic view illustrating a projector including a rear projection screen.
Figure 5:
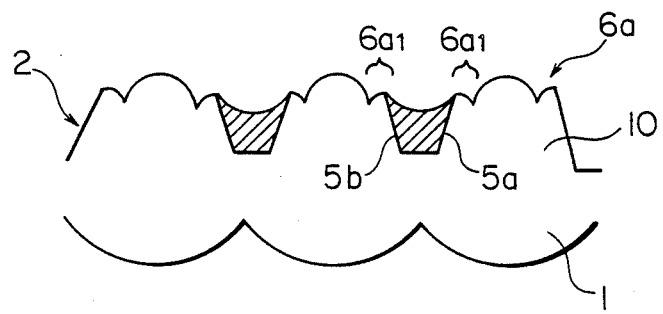
FIG. 5, FIG. 6 and FIG. 7 are cross-sectional views illustrating the other embodiments of the present invention.
Figure 6:
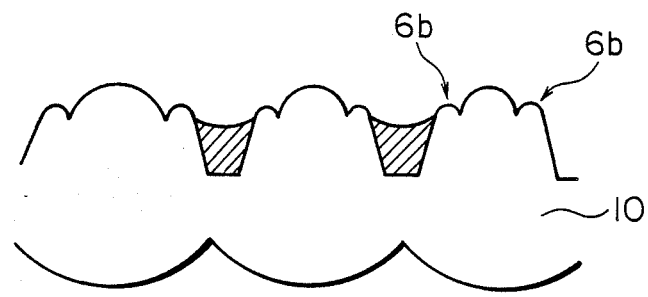

FIG. 5 and FIG. 6 show other embodiments of the present invention, where like reference parts are used to indicate like parts in FIG. 1 and detailed description thereof is omitted.

In the embodiment shown in FIG. 5, the ridges 6a have not a cross-section of a triangular shape as shown in FIG. 2, but have part which is a part of lens 6a1.

In the embodiment shown in FIG. 6, each ridge 6b has a cylindrical top surface. In this embodiment, by selecting a suitable slant angle for each side of the ridge, a screen easily manufactured and hard to be damaged can be obtained without sacrificing the advantage of the present invention, that is the border lines of the light absorbing layers are clear.

Figure 7:
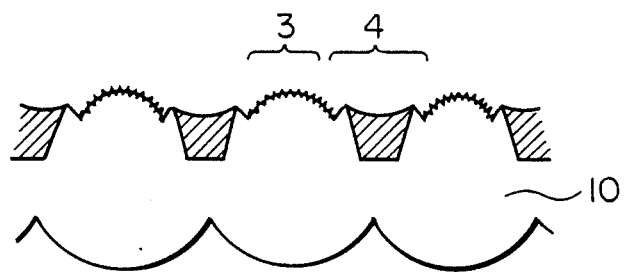

FIG. 7 shows a further another embodiment of the present invention. In this embodiment, lenticular lenses 1 (which may include the ridges in the no-light focusing areas 4) are formed therein with a mat finished surface for decreasing disturbing reflections of ambient light and improving the image quality.

The shape of the ridges 6 is not limited to those defined by the above-mentioned embodiments, but can be variously modified within the scope of the present invention. For example, a shape having a flat top surface may be possible. The dimentions of the ridges are generally so selected, for example, to have a width from 10 μm to 50 μm measured from a side edge of the lenticular lens on the viewing surface, when the pitch of the lenticular lens on the incidence surface is about 1 mm.

The manufacturing process of a screen according to the present invention includes a step of preparing a metal die for molding the screen shown in FIG. 2, and a step of heating and pressing an acrylic resin plate against the metal die, resulting in a replica of a screen medium 10. For the material of the screen medium, a screen material for an usual rear projection screen can be also used. The manufacturing process further includes a step of applying an ink having an ambient light absorbing feature onto the grooves directly or after masking of the light focusing areas 3, thereby resulting in ambient light absorbing layers 7.

Figure 8A:
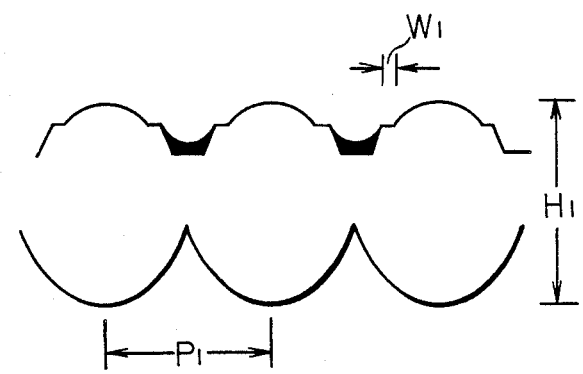
FIGS. 8A-8C are cross-sectional views illustrating rear projection screens referred to in the description as concrete examples.
Figure 8B:
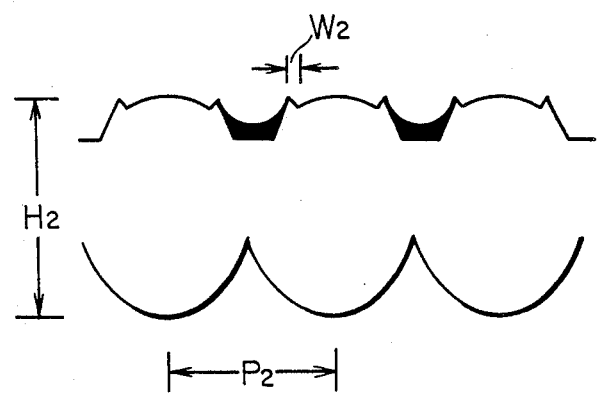
Figure 8C:
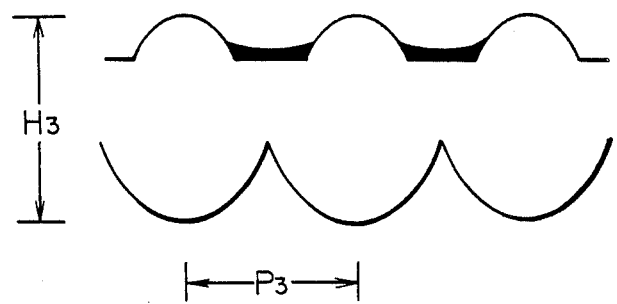
Figure 9:
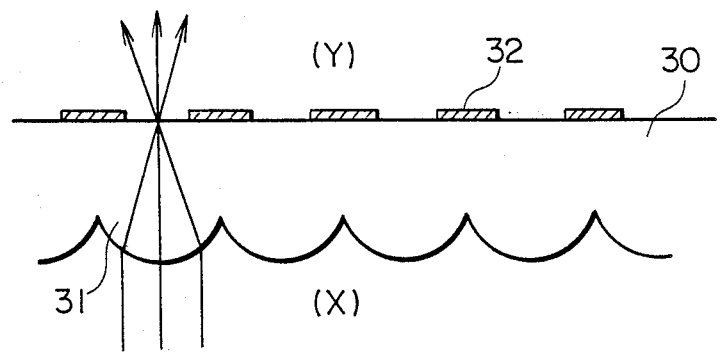
FIG.9-FIG. 12 are schematic crosssectional views illustrating rear projection screens of prior arts.
Figure 10:
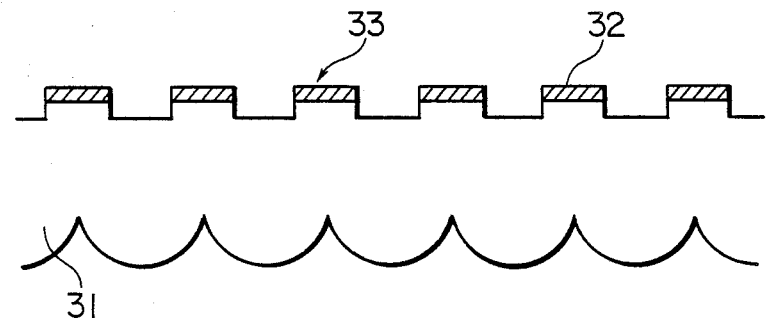

FIGS. 8A through 8C show three kinds of rear projection screens made of acrylic resin, among which FIG. 8A and FIG. 8B illustrate the present invention, while FIG. 8C illustrates prior art for a comparison purpose. Dimensions of each screen are as follows:

Each of these three screen mediums was applied with ink in no-light focusing areas for forming ambient light absorbing layers in the following manner.

An acrylic black ink having viscosity of 5000 cps was applied on the viewing side surface of a screen medium, and a squeegee was slid in the longitudinal direction of the lenticular lenses while it is pressed against the surface of the screen medium so as to fill the ink in the grooves while removing extra ink from the projections parts (light focusing areas) of the screen.

Macroscopic appearances of these three examples are schematically shown in FIG. 3 and FIG. 4. The examples according to the present invention shown in FIG. 8A and FIG. 8B both have an appearance shown in FIG. 3, in which the border lines of the ambient light absorbing layers are clear and straight, resulting in regular border lines. On the other hand, the example of prior art shown in FIG. 8C has an appearance shown in FIG. 4, in which the border lines of the ambient light absorbing layers have zigzag shapes and include projecting portions, resulting in irregular border lines.

As mentioned above, the rear projection screen according to the present invention has the following advantages:

1. The ambient light absorbing layers are prevented from coming off, because they are formed in the ink filling groove, and the capability of holding the ink forming the ambient light absorbing layers is enhanced due to the provision of the rides.

Thereby it is possible to prevent the performance of the screen from lowering.

2. Clear, black stripes are presented in the image, because the boarder lines of the light absorbing layers are clear and straight due to the provision of the ridges on both sides of the grooves. However such clear border lines can not be expected by simple grooves without ridges.

3. Clear image on the screen can be obtained, because the observation surface of the screen is very rugged due to the provision of lenticular lenses, grooves and ridges. The rugged viewing surface decreases disturbing reflections of ambient lights, and assures black stripes as viewed laterally.

What is claimed is:

1. In a rear projection screen having an incidence surface upon which projection light rays impinge, and a viewing surface on which a projected image is visible, comprising lenticular lenses formed on said incidence surface for focusing the projection light rays on said viewing surface within light focusing areas other than no-light focusing areas, lenticular lenses formed on said viewing surface in said light focusing areas; and ambient light absorbing layers formed on said viewing surface in said no-light focusing areas, the improvement wherein each of said no-light focusing areas is formed therein with an ink filling groove and has ridges on both sides of the groove, each of said ridges having top edge, ink is filled in said groove in each no-light focusing area so as to form each of said ambient light absorbing layers having both side edges reaching the top edges of said ridges, whereby the both side edges of each of said light absorbing layers define straight border lines extending therealong.

2. A rear projection screen claimed in claim 1, wherein each of said ridges has a flat top surface.

3. A rear projection screen claimed in claim 1, wherein each of said ridges has a lens shaped top surface.

4. A rear projection screen claimed in claim 1, wherein each of said ridges has a cylindrical top surface.

5. A rear projection screen claimed in claim 1, wherein each of said ridges has a triangular shape top surface.

6. A rear projection screen claimed in claim 1, wherein said lenticular lenses on said viewing surface are composed of mat finished surface.

* * * * *